(12) United States Patent
Udo

(10) Patent No.: US 9,031,399 B2
(45) Date of Patent: May 12, 2015

(54) AUTOFOCUS MECHANISM

(71) Applicant: Mitutoyo Corporation, Kawasaki-shi, Kanagawa (JP)

(72) Inventor: Shohei Udo, Miyazaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 300 days.

(21) Appl. No.: 13/835,098

(22) Filed: Mar. 15, 2013

(65) Prior Publication Data

US 2013/0271995 A1 Oct. 17, 2013

(30) Foreign Application Priority Data

Apr. 17, 2012 (JP) .................................. 2012-094297
Apr. 17, 2012 (JP) .................................. 2012-094298

(51) Int. Cl.
*F21K 99/00* (2010.01)
*G02B 21/24* (2006.01)

(52) U.S. Cl.
CPC ................ *F21K 9/58* (2013.01); *G02B 21/245* (2013.01)

(58) Field of Classification Search
CPC .................................. G03B 13/28; G02B 7/343
See application file for complete search history.

(56) References Cited

U.S. PATENT DOCUMENTS

| 4,230,401 A | * | 10/1980 | Tokutomi et al. | ............. 396/112 |
| 4,333,716 A | * | 6/1982 | Sakane et al. | ................. 396/110 |
| 6,204,962 B1 | | 3/2001 | Kawamura | |
| 2001/0042816 A1 | | 11/2001 | Fujimoto et al. | |

FOREIGN PATENT DOCUMENTS

| JP | 08-043717 | 2/1996 |
| JP | 08-220418 | 8/1996 |
| JP | 11-337812 | 12/1999 |

OTHER PUBLICATIONS

European Search Report, Application No. 13163942.9, dated Aug. 5, 2013, 7 pages.

* cited by examiner

*Primary Examiner* — Clayton E Laballe
*Assistant Examiner* — Noam Reisner
(74) *Attorney, Agent, or Firm* — Rankin, Hill & Clark LLP

(57) ABSTRACT

A computation & control unit defines, as first and second voltages, A+B_signal voltages at distances which give the maximum and minimum voltages of an S_signal voltage, respectively. The unit further defines the higher one of the first and second voltages as an S_signal validity determination voltage and defines a distance at which the S_signal voltage takes on an in-focus determination voltage. The unit defines first and second lower limit voltages, defines the higher one of the first and second lower limit voltages as a lower limit voltage, and defines, as an upper limit voltage, an A+B_signal voltage at a distance which gives an in-focus determination voltage between the maximum and minimum positions of the S_signal voltage. An input and output unit outputs the upper and lower limit voltages as the upper and lower limit values of a settable range of the S_signal validity determination voltage.

6 Claims, 8 Drawing Sheets

AUTOFOCUS MECHANISM

CROSS-REFERENCE TO RELATED APPLICATION

The disclosure of Japanese Patent Applications No. 2012-94297 and No. 2012-94298 both filed on Apr. 17, 2012 including specifications, drawings and claims is incorporated herein by reference in its entirety.

TECHNICAL FIELD

The present invention relates to autofocus mechanisms, and more particularly, to an autofocus mechanism which can be employed for a variety of measurement workpieces while enabling easy-to-handle stable autofocus control.

BACKGROUND ART

Conventionally known is an autofocus mechanism disclosed in Japanese Patent Application Laid-Open No. Hei. 8-220418 (hereafter referred to as Patent Document 1). As shown in FIG. 7, the autofocus mechanism 1 includes an objective lens 14 for collecting a laser beam 16 to irradiate a workpiece 2 to be measured (hereafter referred to as a measurement workpiece) therewith; a beam splitter 20 for splitting light reflected from the measurement workpiece 2 through the objective lens 14; a first pin hole 22 disposed in front of a focal position FP of one split beam of the reflected light; a first photodiode 24 for receiving the reflected beam having passed through the first pin hole 22; a second pin hole 26 disposed behind the focal position FP of the other split beam of the reflected light; a second photodiode 28 for receiving the reflected beam having passed through the second pin hole 26; and a processing unit (not shown) which converts signals output from the first and second photodiodes 24 and 28 into an A_signal voltage and a B_signal voltage so as to determine an A+B_signal voltage V(A+B) and an S_signal voltage VS, which are expressed by following Equations (1) and (2), respectively. Here, the focal position FP of the reflected beam is the position which is obtained when the distance Z between the objective lens 14 and the measurement workpiece 2 is just equal to the focal distance. Note that symbol 12 indicates an image-forming lens.

$$A + B\_signal\ voltage\ V(A+B) = A\_signal\ voltage + B\_signal\ voltage \quad (1)$$

$$S\_signal\ voltage\ VS = \frac{(A\_signal\ voltage - B\_signal\ voltage)}{(A\_signal\ voltage + B\_signal\ voltage)} \quad (2)$$

The autofocus mechanism 1 employs, as an in-focus position PFJ, the position at which the S_signal voltage VS is equal to a predetermined voltage (an in-focus determination voltage VFJ which is obtained when the distance Z between the measurement workpiece 2 and the objective lens 14 is equal to the focal distance of the objective lens 14). The autofocus mechanism 1 positions the measurement workpiece 2 relative to the objective lens 14 so as to achieve the in-focus position PFJ, thereby providing autofocus control.

SUMMARY OF INVENTION

Technical Problem

However, the S_signal voltage VS expressed by Equation (2) varies with the distance Z between the objective lens 14 and the measurement workpiece 2 as shown in FIG. 8 (in which the vertical axis represents the voltage E and the horizontal axis represents the distance Z, the same holding true for the other graphs), so that the same voltage as the in-focus determination voltage VFJ may exist at several positions, denoted by hollow arrows, other than the in-focus position PFJ.

In this context, the A+B_signal voltage V(A+B) expressed by Equation (1) is used to determine whether the S_signal voltage VS is available to the determination of the in-focus position PFJ. As shown in FIG. 9(A), when the A+B_signal voltage V(A+B) has a portion (an in-focus position determinable region EAV) which is equal to or greater than a predetermined voltage (an S_signal validity determination voltage VSV), the in-focus position PFJ is determined from the S_signal voltage VS which exists within the in-focus position determinable region EAV. That is, the S_signal validity determination voltage VSV determines a valid region of the in-focus determination voltage VFJ at the distance Z, thus serving as the threshold voltage for determining, as valid, the in-focus determination voltage VFJ at the distance Z at which a voltage obtained by subtracting itself from the A+B_signal voltage V(A+B) is equal to or greater than zero.

Here, the A+B_signal voltage V(A+B) has the shape of a normal distribution typically with the maximum value generally at the in-focus position PFJ; however, the A+B_signal voltage V(A+B) varies in signal level depending on the reflectivity of the measurement workpiece 2. For example, as shown in FIG. 9(B), when the measurement workpiece 2 has a lower reflectivity, the A+B_signal voltage V(A+B) is lower across the entire region along the distance Z, narrowing the in-focus position determinable region EAV. This causes the autofocus controllable range to be reduced. At worst, the A+B_signal voltage V(A+B) lowered to be less than the S_signal validity determination voltage VSV would make the in-focus position determinable region EAV unavailable, so that no autofocus control can be provided.

In contrast, as shown in FIG. 9(C), when the measurement workpiece 2 has a higher reflectivity, the A+B_signal voltage V(A+B) is higher, causing the in-focus position determinable region EAV to be excessively widened. Thus, the positions other than the in-focus position PFJ (the hollow circles on both sides) would also be erroneously determined to be the in-focus position PFJ.

Conversely, in the same manner as mentioned above, different setting values for the S_signal validity determination voltage VSV would make the aforementioned in-focus position determinable region EAV unavailable or excessively widened.

For this reason, to provide autofocus control with stability, it is crucial how to set the value of the S_signal validity determination voltage VSV. For this reason, it is conceivable to set the S_signal validity determination voltage VSV for each measurement workpiece 2. However, the measurement workpiece 2 varies so widely that only an initial adjustment made, for example, at the factory prior to shipment, to the setting of the S_signal validity determination voltage VSV would not be sufficient. Because of this, the S_signal validity determination voltage VSV may be made variable. However, in this case, it is necessary to measure the S_signal voltage VS and the A+B_signal voltage V(A+B) for the distance Z or to keep track of a method for autofocus control. Such a procedure would be very complicated and possibly make autofocus control hard to handle.

In this context, the present invention was developed to address the conventional problems. It is therefore an object of the invention to provide an autofocus mechanism which can be employed for various types of measurement workpieces while enabling easy-to-handle stable autofocus control.

Solution to Problem

The invention according to claim 1 of the present application is an autofocus mechanism which includes: an objective lens that collects a laser beam to irradiate a measurement workpiece therewith; a beam splitter that splits light reflected from the measurement workpiece through the objective lens; a first light amount restricting element disposed in front of a focal position of one split beam of the reflected light; a first light-receiving element that receives the reflected beam having passed through the first light amount restricting element; a second light amount restricting element disposed behind a focal position of the other split beam of the reflected light; a second light-receiving element that receives the reflected beam having passed through the second light amount restricting element; and a processing unit that converts signals output from the first and second light-receiving elements into an A_signal voltage and a B_signal voltage, respectively, so as to determine an A+B_signal voltage and an S_signal voltage, which are expressed by Equations (1) and (2) below. The autofocus mechanism solved the problems by the processing unit including first & second voltage computing means that defines, as a first voltage and a second voltage, A+B_signal voltages at distances between the objective lens and the measurement workpiece, the first voltage and the second voltage being indicative of the maximum voltage and the minimum voltage of the S_signal voltage, respectively, S_signal validity determination voltage computing means that defines a higher one of the first voltage and the second voltage as an S_signal validity determination voltage serving as a threshold voltage which determines, as valid, an in-focus determination voltage, the in-focus determination voltage being equal to the S_signal voltage obtained when the distance is equal to a focal distance of the objective lens, and focal distance computing means that defines, as the focal distance of the objective lens, a distance at which the S_signal voltage takes on the in-focus determination voltage, the distance being given by the A+B_signal voltage equal to or greater than the S_signal validity determination voltage, $$A + B\_signal\ voltage = A\_signal\ voltage + B\_signal\ voltage, \quad (1)$$

$$S\_signal\ voltage = \frac{(A\_signal\ voltage - B\_signal\ voltage)}{(A\_signal\ voltage + B\_signal\ voltage)}. \quad (2)$$

The invention according to claim 2 of the present application is configured to include a storage unit that stores the S_signal validity determination voltage.

The invention according to claim 3 of the present application is configured such that the processing unit includes communication means connected to the S_signal validity determination voltage computing means, and a host controller capable of communicating with the communication means.

The invention according to claim 4 of the present application is an autofocus mechanism which includes: an objective lens that collects a laser beam to irradiate a measurement workpiece therewith; a beam splitter that splits light reflected from the measurement workpiece through the objective lens; a first light amount restricting element disposed in front of a focal position of one split beam of the reflected light; a first light-receiving element that receives the reflected beam having passed through the first light amount restricting element; a second light amount restricting element disposed behind a focal position of the other split beam of the reflected light; a second light-receiving element that receives the reflected beam having passed through the second light amount restricting element; and a processing unit that converts signals output from the first and second light-receiving elements into an A_signal voltage and a B_signal voltage, respectively, so as to determine an A+B_signal voltage and an S_signal voltage, which are expressed by Equations (1) and (2) above. The autofocus mechanism solved the problems by the processing unit including: first lower limit voltage computing means that defines a first lower limit voltage so as to reduce a distance between the objective lens and the measurement workpiece from a maximum position indicative of a maximum voltage of the S_signal voltage, the first lower limit voltage being defined as the A+B_signal voltage at a distance at which the sum of an in-focus determination voltage and an allowable voltage is the S_signal voltage, the in-focus determination voltage being the S_signal voltage obtained when the distance is equal to the focal distance of the objective lens, the allowable voltage being set to be less than a voltage obtained by subtracting the in-focus determination voltage from the maximum voltage; second lower limit voltage computing means that defines a second lower limit voltage so as to increase the distance from a minimum position indicative of a minimum voltage of the S_signal voltage, the second lower limit voltage being defined as the A+B_signal voltage at the distance at which a difference between the in-focus determination voltage and the allowable voltage is equal to the S_signal voltage; lower limit voltage computing means that defines a higher one of the first and second lower limit voltages as a lower limit voltage; upper limit voltage computing means that defines, as an upper limit voltage, the A+B_signal voltage at the distance which gives the in-focus determination voltage between the maximum position and the minimum position of the S_signal voltage; and output means that outputs the upper limit voltage and the lower limit voltage as an upper limit value and a lower limit value of a settable range of an S_signal validity determination voltage, the S_signal validity determination voltage being a threshold voltage for determining, as valid, the in-focus determination voltage at the distance at which a voltage obtained by subtracting itself from the A+B_signal voltage is equal to or greater than zero.

The invention according to claim 5 of the present application is configured such that the output means serves as an input and output unit into which the S_signal validity determination voltage can be entered, and the processing unit includes a storage unit that stores the S_signal validity determination voltage.

The invention according to claim 6 of the present application is configured such that the processing unit includes communication means connected to the lower limit voltage computing means and the upper limit voltage computing means, and a host controller capable of communicating with the communication means, with the host controller connected with the output means.

Advantageous Effects of Drawings

The present invention is applicable to various types of measurement workpieces while enabling easy-to-handle stable autofocus control.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Figure 1:
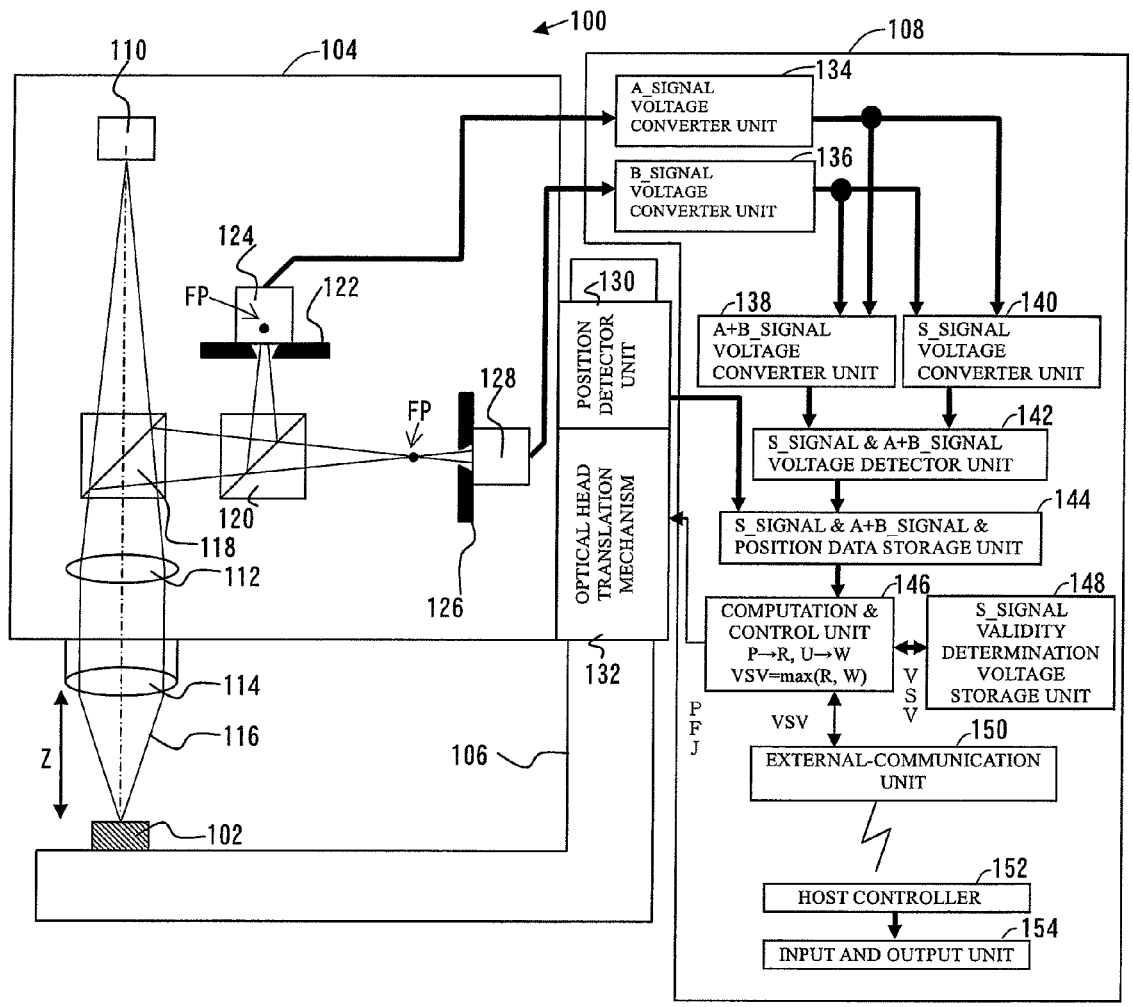
FIG. 1 is a schematic view illustrating an autofocus mechanism according to a first embodiment of the present invention.

Now, referring to the drawings, an example of an embodiment of the present invention will be described in more detail.

To start with, a description will be made to the configuration of an autofocus mechanism according to a first embodiment with reference to FIG. 1.

As shown in FIG. 1, an autofocus mechanism 100 includes an optical head 104, a stand 106 for supporting the optical head 104 movably in the Z-axis direction, and a processing unit 108 for processing an output from the optical head 104. Note that a measurement workpiece 102 is supported by the stand 106 via an X-Y stage (not shown).

As shown in FIG. 1, the optical head 104 includes a laser diode 110, a tube lens 112, an objective lens 114, a first beam splitter 118, a second beam splitter 120, a first pin hole 122 (the first light amount restricting element), a first photodiode 124 (the first light-receiving element), a second pin hole 126 (the second light amount restricting element), and a second photodiode 128 (the second light-receiving element). Note that the first and second pin holes 122 and 126 may be replaced with a light amount restricting element which employs a knife edge or the like.

As shown in FIG. 1, the laser diode 110 emits a laser beam 116 for irradiating the measurement workpiece 102 therewith. The emitted laser beam 116 is collimated by the tube lens 112 (the tube lens may also be eliminated). The collimated laser beam 116 is collected by the objective lens 114 so as to irradiate the measurement workpiece 102 therewith.

After the irradiation, the laser beam 116 is reflected by the measurement workpiece 102. Then, the reflected laser beam 116 passes through the objective lens 114 and the tube lens 112 and is then reflected by the first beam splitter 118. The laser beam 116 reflected by the first beam splitter 118 is split into two at the second beam splitter 120. That is, the second beam splitter 120 (beam splitter) splits the light reflected from the measurement workpiece 102 through the objective lens 114.

As shown in FIG. 1, the first pin hole 122 is disposed in front of a focal position FP of one of the split beams of the reflected light. Here, the focal position FP of the reflected beam is obtained when the distance Z between the objective lens 114 and the measurement workpiece 102 is equal to the focal distance, with the focal position FP falling within the first photodiode 124. The first photodiode 124 receives the reflected beam having passed through the first pin hole 122. On the other hand, as shown in FIG. 1, the second pin hole 126 is disposed behind the focal position FP of the other split beam of the reflected light. That is, the focal position FP of the reflected beam here is located outside (in front of) the second pin hole 126. The second photodiode 128 receives the reflected beam having passed through the second pin hole 126. The first and second photodiodes 124 and 128 each output an electrical signal depending on the amount of the received light.

As shown in FIG. 1, the stand 106 is provided with an optical head translation mechanism 132 which is movable in the Z direction, with the optical head 104 secured to the optical head translation mechanism 132. The optical head translation mechanism 132 is provided with a position detector unit 130 in a manner such that the position detector unit 130 detects the amount of travel of the optical head translation mechanism 132 in the Z-axis direction and then outputs the resulting amount of travel as the position data of the distance Z.

As shown in FIG. 1, the processing unit 108 includes an A_signal voltage converter unit 134, a B_signal voltage converter unit 136, an A+B_signal voltage converter unit 138, an S_signal voltage converter unit 140, an S_signal & A+B_signal voltage detector unit 142, an S_signal & A+B_signal & position data storage unit 144, a computation & control unit 146 (the first & second voltage computing means+the S_signal validity determination voltage computing means+the focal distance computing means), an S_signal validity determination voltage storage unit 148 (the storage unit), an external-communication unit 150 (the communication means), a host controller 152, and an input and output unit 154 (the output means).

As shown in FIG. 1, the A_and B_signal voltage converter units 134 and 136 convert signals output from the first and second photodiodes 124 and 128 into voltages, i.e., A_ and B_signal voltages, respectively. The A_ and B_signal voltages are converted by the A+B_signal voltage converter unit 138 into an A+B_signal voltage V(A+B) in accordance with Equation (1) and converted by the S_signal voltage converter unit 140 into an S_signal voltage VS in accordance with Equation (2). The S_signal & A+B_signal voltage detector unit 142 measures the S_signal voltage VS and the A+B_signal voltage V(A+B) corresponding to a change in the distance Z between the objective lens 114 and the measurement workpiece 102, thereby converting each of the voltages VS and V(A+B) into data. The S_signal & A+B_signal & position data storage unit 144 stores, in combination, the S_signal voltage VS and the A+B_signal voltage V(A+B) having been converted into data, and the position data of the distance Z output from the position detector unit 130. The computation & control unit 146 defines an S_signal validity determination voltage VSV from the aforementioned combination of data. Note that the S_signal validity determination voltage VSV determines a valid region of an in-focus determination voltage VFJ at the distance Z, thus serving as the threshold voltage which determines, as valid, the in-focus determination voltage VFJ at the distance Z at which a voltage obtained by subtracting itself from the A+B_signal voltage V(A+B) is equal to or greater than zero, that is, at the distance Z at which the A+B_signal voltage V(A+B) is equal to or greater than the S_signal validity determination voltage VSV (the in-focus determination voltage VFJ is obtained when the distance Z is equal to the focal distance of the objective lens 114). The defined S_signal validity determination voltage VSV is stored in the S_signal validity determination voltage storage unit 148. The stored S_signal validity determination voltage VSV is used for autofocus control. The external-communication unit 150 is connected to the computation & control unit 146 and capable of communicating with the host controller 152 (either by radio or by wire). That is, the external-communication unit 150 is configured to inform the host controller 152 of the S_signal validity determination voltage VSV. The host controller 152 is connected with the input and output unit 154. The input and output unit 154 is made up of, for example, a keyboard, a loudspeaker, and a monitor, so that the S_signal validity determination voltage VSV is displayed (output) on the monitor. Note that the input and output unit 154 can be used to enter various setting values thereon. Note that in the processing unit 108, the host controller 152 and the input and output unit 154 are separated from the other components, thereby allowing the host controller 152 and the input and output unit 154 to be shared with other autofocus mechanisms.

Figure 2:
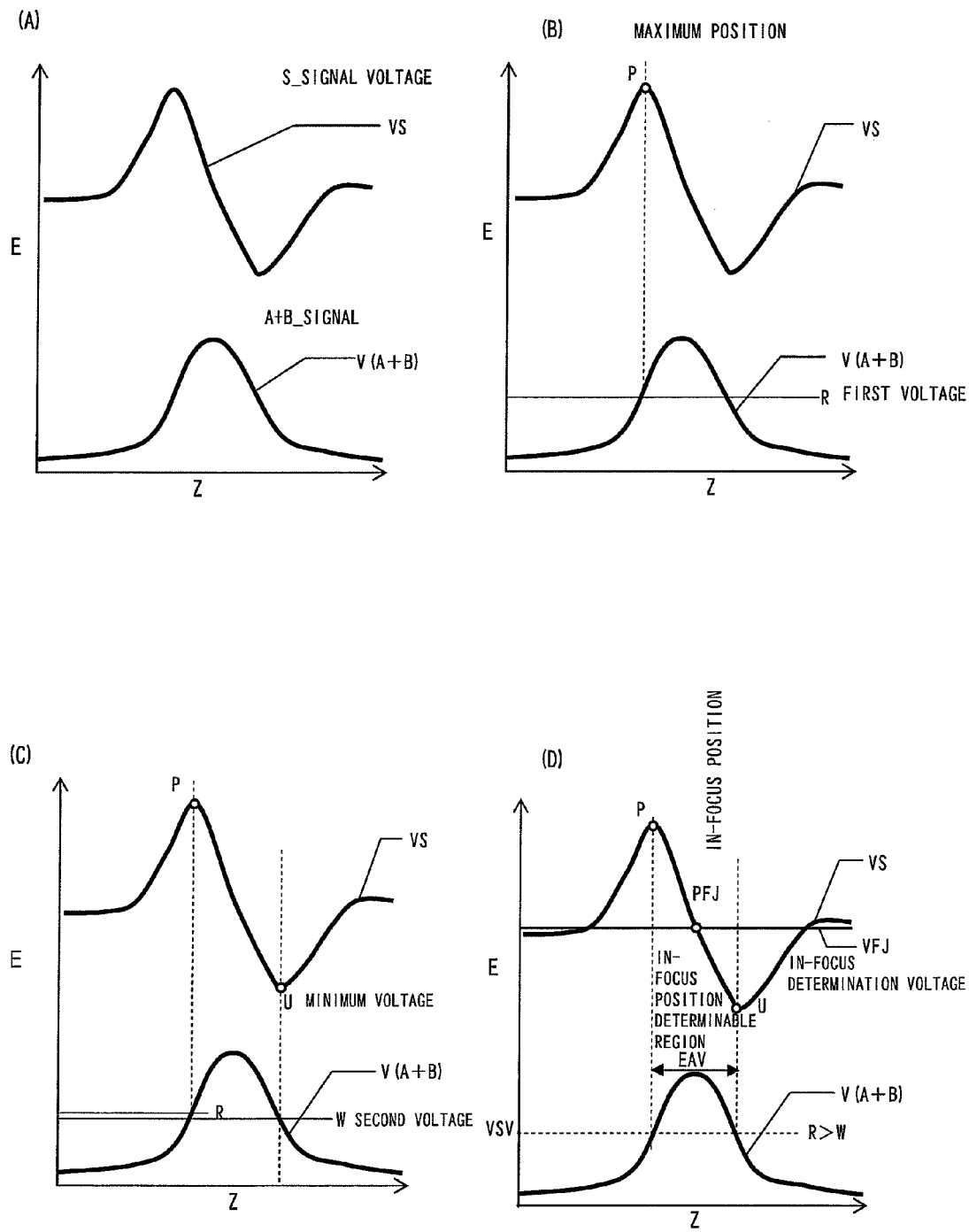
FIG. 2 is an explanatory schematic view illustrating a procedure for determining the focal distance of an objective lens in the first embodiment.

Now, referring to FIGS. 2 and 3, a description will be made to a procedure for determining the focal distance Z of the objective lens 114 for autofocus control.

First, the optical head translation mechanism 132 is moved in the Z direction, thereby displacing the optical head 104. Then, the S_signal voltage VS and the A+B_signal voltage V(A+B) corresponding to a change in the distance Z, in the vicinity of the in-focus position PFJ, between the objective lens 114 and the measurement workpiece 102 are measured in regular increments of the distance Z between the objective lens 114 and the measurement workpiece 102 (FIG. 2(A) and step S2 of FIG. 3). Then, the measurement results are sequentially stored in the S_signal & A+B_signal & position data storage unit 144.

Next, the S_signal voltage VS, the A+B_signal voltage V(A+B), and the position data are read into the computation & control unit 146. Then, the A+B_signal voltages V(A+B) at the distance Z which give the maximum voltage and the minimum voltage of the S_signal voltage VS are defined as a first voltage R and a second voltage W, respectively. That is, a maximum position P of the S_signal voltage VS is calculated, and the A+B_signal voltage V(A+B) corresponding to the maximum position P is determined as the first voltage R (FIG. 2(B) and step S4 of FIG. 3). Then, a minimum position U of the S_signal voltage VS is calculated and the A+B_signal voltage V(A+B) corresponding to the minimum position U is determined as the second voltage W (FIG. 2(C) and step S6 of FIG. 3).

Then, the higher one of the first voltage R and the second voltage W is defined as the S_signal validity determination voltage VSV, which is a threshold voltage for determining the in-focus determination voltage VFJ to be valid. That is, the first voltage R and the second voltage W are compared with each other (step S8 of FIG. 3). After that, if the first voltage R is equal to or greater than the second voltage W, then the first voltage R is employed as the S_signal validity determination voltage VSV (FIG. 2(C), step S10 of FIG. 3, the present embodiment being the case). In contrast, if the first voltage R is less than the second voltage W, then the second voltage W is employed as the S_signal validity determination voltage VSV (step S12 of FIG. 3).

Figure 3:
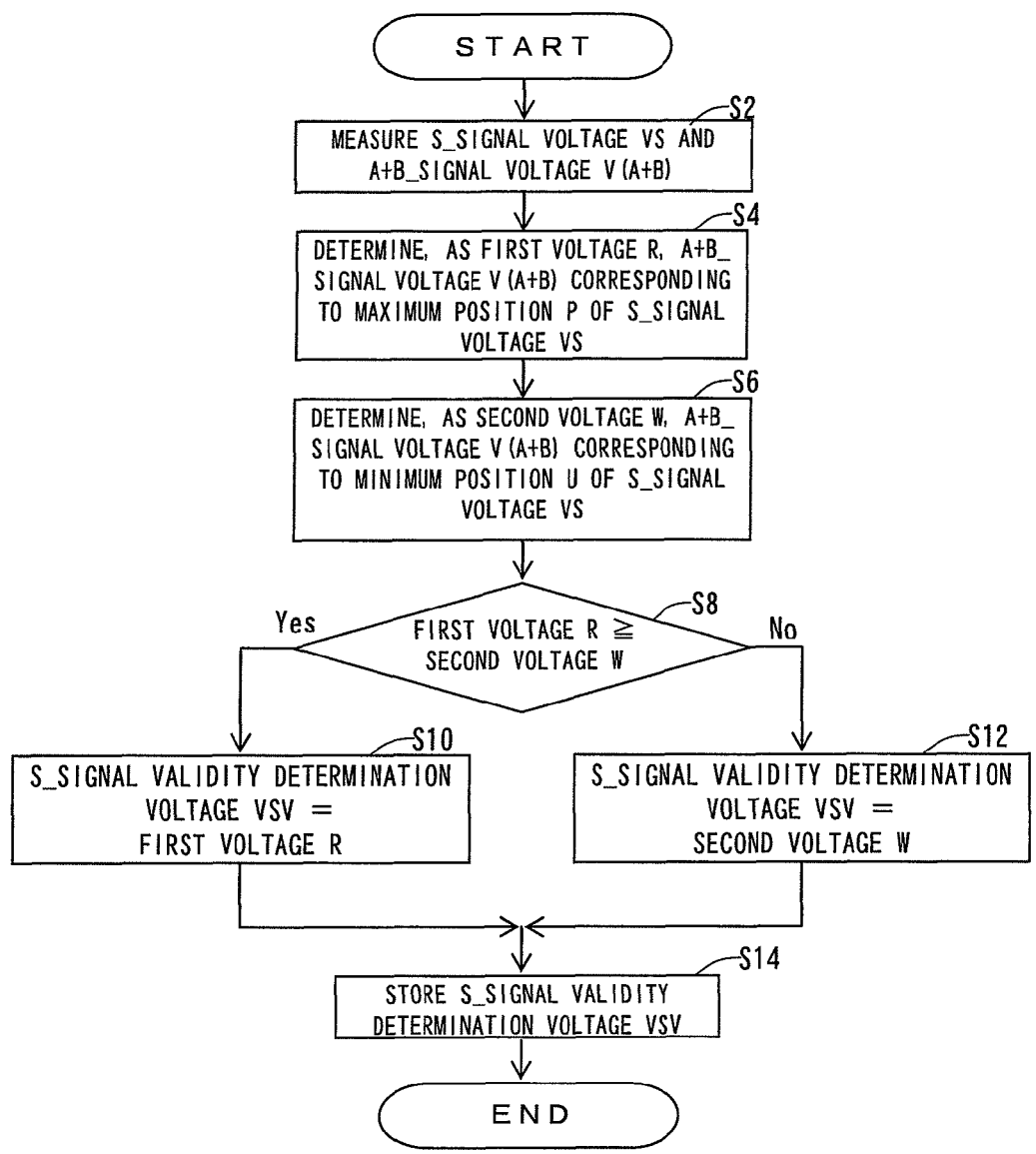
FIG. 3 is an explanatory flowchart showing a procedure for determining the focal distance of an objective lens in the first embodiment.

After that, the resulting S_signal validity determination voltage VSV is stored in the S_signal validity determination voltage storage unit 148 (step S14 of FIG. 3).

For autofocus control, in an in-focus position determinable region EAV of the A+B_signal voltage V(A+B) that is equal to or greater than the S_signal validity determination voltage VSV, the position of the S_signal voltage VS given by the in-focus determination voltage VFJ is employed as the focal distance of the objective lens 114 (FIG. 2(D)).

In the present embodiment, the A+B_signal voltage V(A+B) specified by either the maximum position P or the minimum position U of the S_signal voltage VS is employed as the S_signal validity determination voltage VSV. It is thus possible to prevent the in-focus position determinable region EAV specified by the S_signal validity determination voltage VSV from extending out of the maximum position P and the minimum position U of the S_signal voltage VS and determine the in-focus position determinable region EAV with reliability.

Thus, the present embodiment can be employed for various types of measurement workpieces 102 while enabling easy-to-handle stable autofocus control. This allows the autofocus mechanism 100 of the present embodiment to be applicable to optical microscopes, FPD (flat panel display) testing/repair apparatus, LCD testing/repair apparatus, IC testing/repair apparatus, and non-contact displacement measuring devices.

Note that in the aforementioned embodiment, the processing unit 108 includes the external-communication unit 150 connected to the computation & control unit 146, and the host controller 152 capable of communicating with the external-communication unit 150, and the host controller 152 is connected with the input and output unit 154. However, the present invention is not limited thereto. It is also acceptable that the external-communication unit 150 and the host controller 152 are eliminated, with the input and output unit 154 connected directly to the computation & control unit.

Furthermore, in the aforementioned embodiment, the computation & control unit 146 defines the S_signal validity determination voltage VSV and the in-focus determination voltage VFJ that gives the focal distance of the objective lens 114. However, the present invention is not limited thereto. The computation & control unit 146 may be simply configured to control the exchange of data between the S_signal & A+B_signal & position data storage unit 144, the S_signal validity determination voltage storage unit 148, and the external-communication unit 150, allowing the aforementioned computations to be performed by the host controller 152.

Now, referring to FIG. 4, a description will be made to the configuration of an autofocus mechanism according to a second embodiment with attention concentrated on the points that are different from those of the first embodiment.

Figure 4:
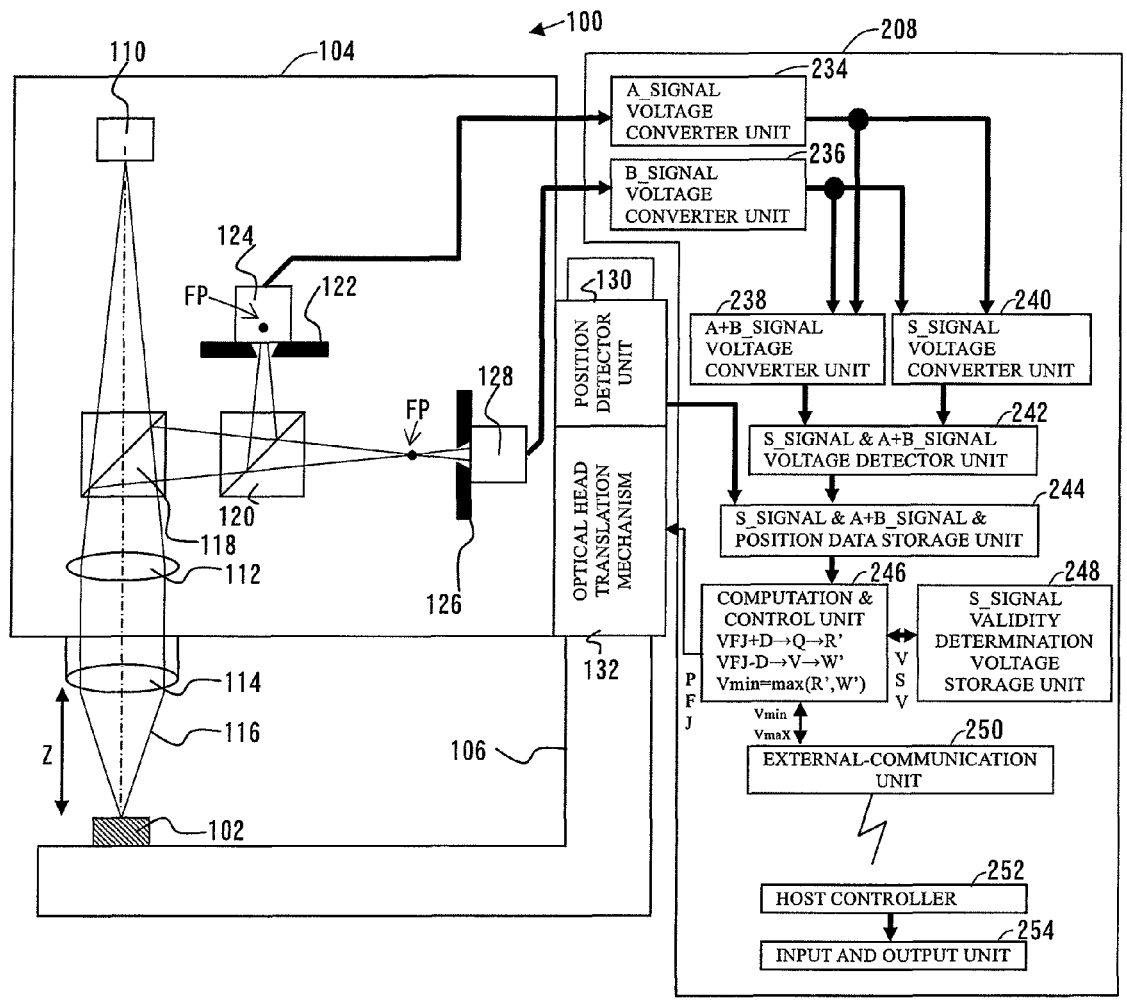
FIG. 4 is a schematic view illustrating an autofocus mechanism according to a second embodiment of the present invention.

As shown in FIG. 4, a processing unit 208 of the present embodiment includes an A_signal voltage converter unit 234, a B_signal voltage converter unit 236, an A+B_signal voltage converter unit 238, an S_signal voltage converter unit 240, an S_signal & A+B_signal voltage detector unit 242, an S_signal & A+B_signal & position data storage unit 244, a computation & control unit 246 (the first lower limit voltage computing means+the second lower limit voltage computing means+the lower limit voltage computing means+the upper limit voltage computing means), an S_signal validity determination voltage storage unit 248 (the storage unit), an external-communication unit 250 (the communication means), a host controller 252, and an input and output unit 254 (the output means).

As shown in FIG. 4, the A_ and B_signal voltage converter units 234 and 236 convert signals output from the first and second photodiodes 124 and 128 into voltages, i.e., the A_ and B_signal voltages, respectively. The A_ and B_signal voltages are converted by the A+B_signal voltage converter unit 238 into the A+B_signal voltage V(A+B) in accordance with Equation (1) and converted by the S_signal voltage converter unit 240 into the S_signal voltage VS in accordance with Equation (2). The S_signal & A+B_signal voltage detector unit 242 measures the S_signal voltage VS and the A+B_signal voltage V(A+B) corresponding to a change in the distance Z between the objective lens 114 and the measurement workpiece 102, thereby converting each of the voltages VS and V(A+B) into data. The S_signal & A+B_signal & position data storage unit 244 stores, in combination, the S_signal voltage VS and the A+B_signal voltage V(A+B) having been converted into data, and the position data of the distance Z output from the position detector unit 130. The computation & control unit 246 calculates an upper limit voltage Vmax and a lower limit voltage Vmin of a settable range of the S_signal validity determination voltage VSV from the aforementioned combination of data. Note that the S_signal validity determination voltage VSV determines a valid region of the in-focus determination voltage VFJ at the distance Z, thus serving as the threshold voltage for determining, as valid, the in-focus determination voltage VFJ at the distance Z at which a voltage obtained by subtracting itself from the A+B_signal voltage V(A+B) is equal to or greater than zero (the in-focus determination voltage VFJ is obtained when the distance Z is equal to the focal distance of the objective lens 114). The external-communication unit 250 is connected to the computation & control unit 246 and capable of communicating with the host controller 252 (either by radio or by wire). That is, the external-communication unit 250 is configured to inform the host controller 252 of the upper limit voltage Vmax and the lower limit voltage Vmin. The host controller 252 is connected with the input and output unit 254. The input and output unit 254 is made up of, for example, a keyboard, a loudspeaker, and a monitor, so that the upper limit voltage Vmax and the lower limit voltage Vmin are displayed (output) on the monitor as the upper limit value and the lower limit value of a settable range of the S_signal validity determination voltage VSV. On the basis of the upper limit value and the lower limit value, the operator enters the S_signal validity determination voltage VSV on the keyboard. The entered S_signal validity determination voltage VSV is transferred from the host controller 252 to the external-communication unit 250. Then, the S_signal validity determination voltage VSV is stored in the S_signal validity determination voltage storage unit 248 connected to the computation & control unit 246. The stored S_signal validity determination voltage VSV is used for autofocus control. Note that in the processing unit 208, the host controller 252 and the input and output unit 254 are separated from the other components, thereby allowing the host controller 252 and the input and output unit 254 to be shared with other autofocus mechanisms.

Figure 5:
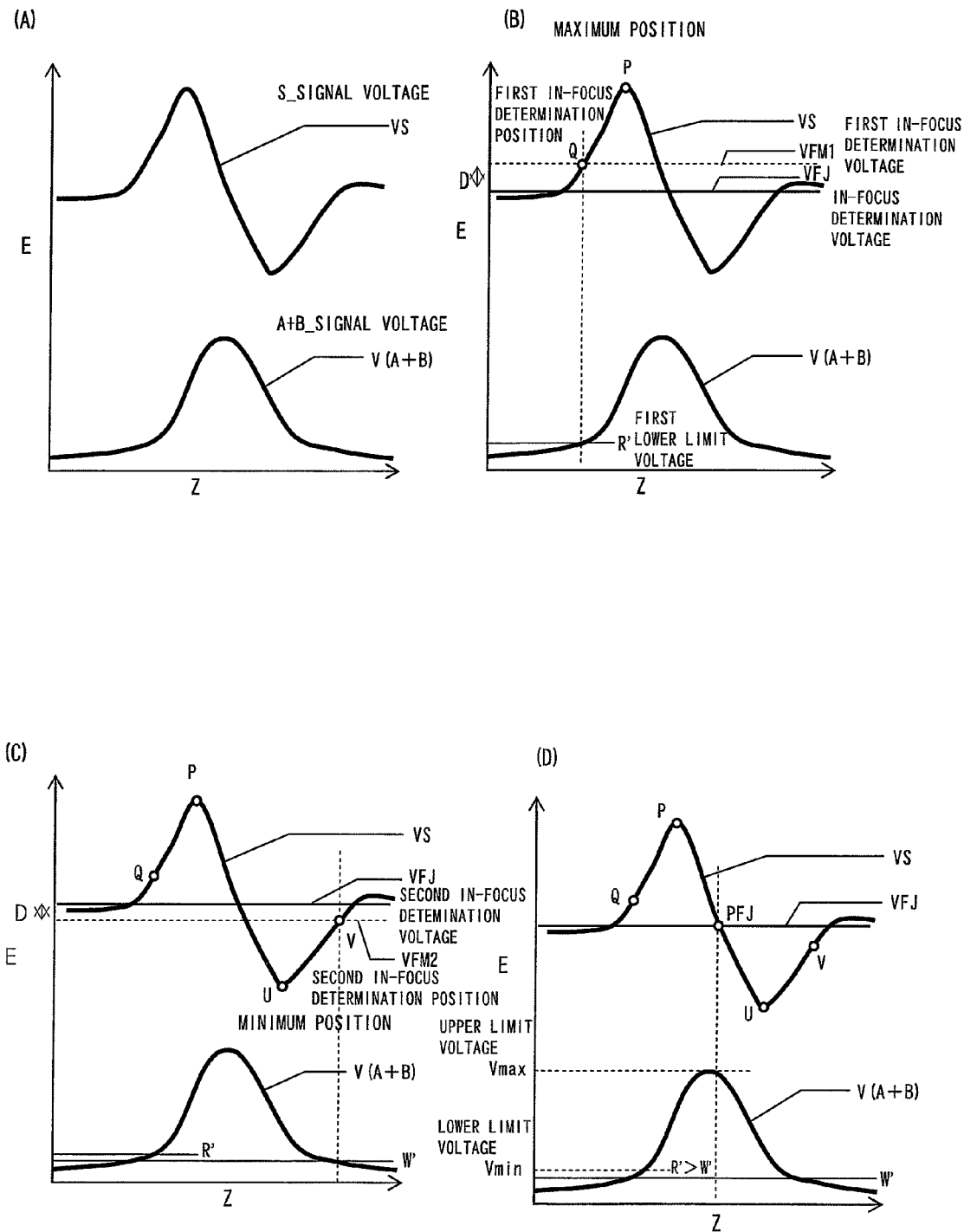
FIG. 5 is an explanatory schematic view illustrating a procedure for outputting the upper limit value and the lower limit value of a settable range of an S_signal validity determination voltage in the second embodiment.

Now, referring to FIGS. 5 and 6, a description will be made to a procedure for outputting the upper limit value and the lower limit value of a settable range of the S_signal validity determination voltage VSV.

First, the optical head translation mechanism 132 is moved in the Z direction, thereby displacing the optical head 104. Then, the S_signal voltage VS and the A+B_signal voltage V(A+B) corresponding to a change in the distance Z, in the vicinity of the in-focus position PFJ, between the objective lens 114 and the measurement workpiece 102 are measured in regular increments of the distance Z between the objective lens 114 and the measurement workpiece 102 (FIG. 5(A) and step S22 of FIG. 6). Then, the measurement results are sequentially stored in the S_signal & A+B_signal & position data storage unit 244.

Next, the S_signal voltage VS, the A+B_signal voltage V(A+B), and the position data are read into the computation & control unit 246. Then, a maximum position P indicative of the maximum voltage of the S_signal voltage VS is calculated (step S24 of FIG. 6). Then, calculated is a first in-focus determination position Q on the S_signal voltage VS which is located so as to decrease the distance Z between the objective lens 114 and the measurement workpiece 102 from the maximum position P (leftward in the direction of Z in FIG. 5(B)) (step S26 of FIG. 6). The first in-focus determination position Q is the position at which the sum of the in-focus determination voltage VFJ and an allowable voltage D (a first in-focus determination voltage VFM1) is equal to the S_signal voltage VS. Note that the in-focus determination voltage VFJ is obtained when the distance Z is equal to the focal distance of the objective lens 114. Furthermore, the allowable voltage D is defined by taking into account electrical noise in the autofocus mechanism 100 and measurement errors caused by vibrations of mechanical parts, and set to be less than the voltage obtained by subtracting the in-focus determination voltage VFJ from the maximum voltage of the S_signal voltage VS (Taking a specific example, the optical head 104 is stopped at the in-focus position PFJ and the S_signal voltage VS is measured several times. From the plurality of measurement values, the standard deviation ($3\sigma$) is determined, and half that value can be employed as the allowable voltage D). Then, the A+B_signal voltage V(A+B) at the same distance Z as the first in-focus determination position Q is defined as a first lower limit voltage R' (FIG. 5(B) and step S28 of FIG. 6).

Figure 6:
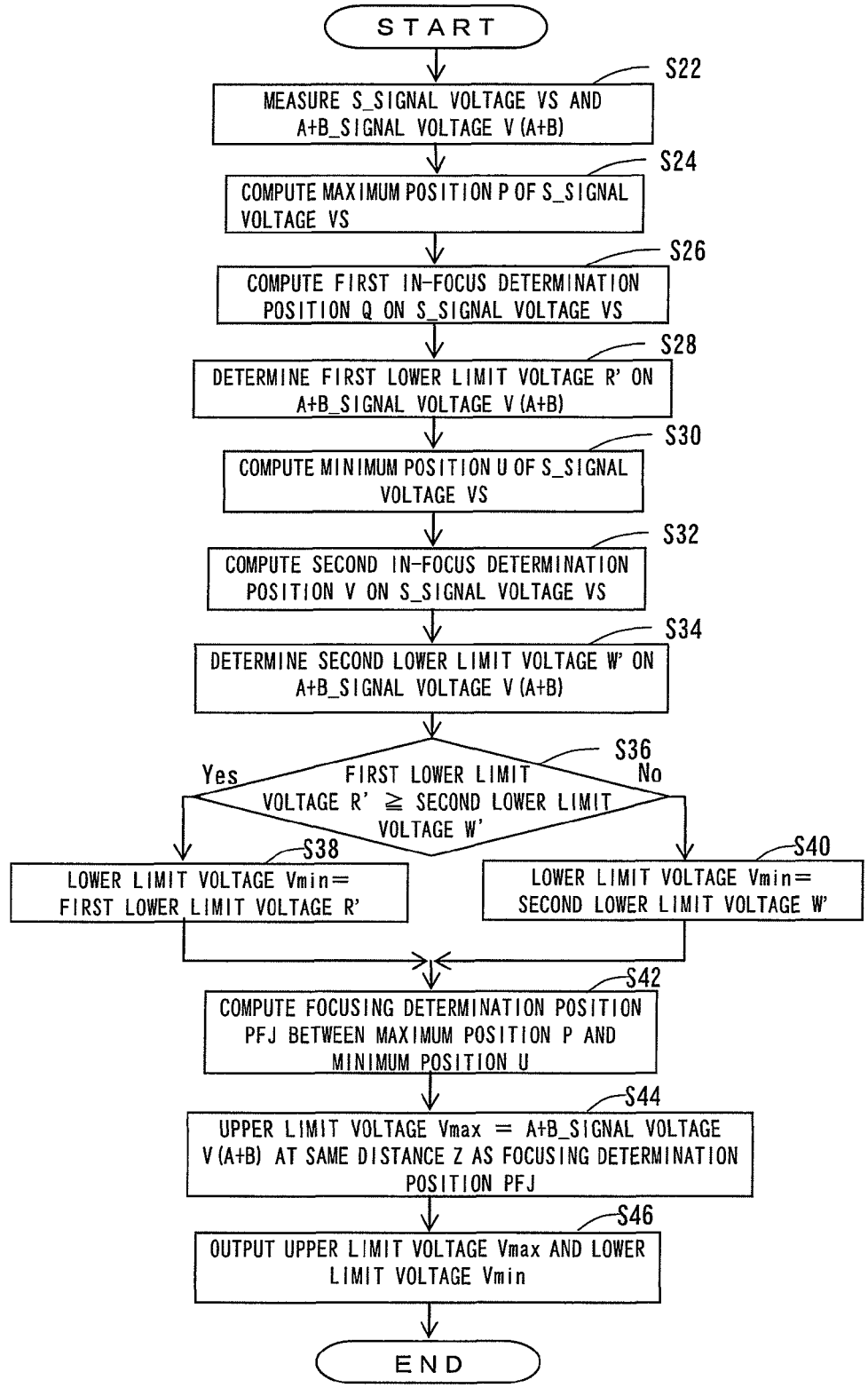
FIG. 6 is an explanatory flowchart showing a procedure for outputting the upper limit value and the lower limit value of a settable range of an S_signal validity determination voltage in the second embodiment.
Figure 7:
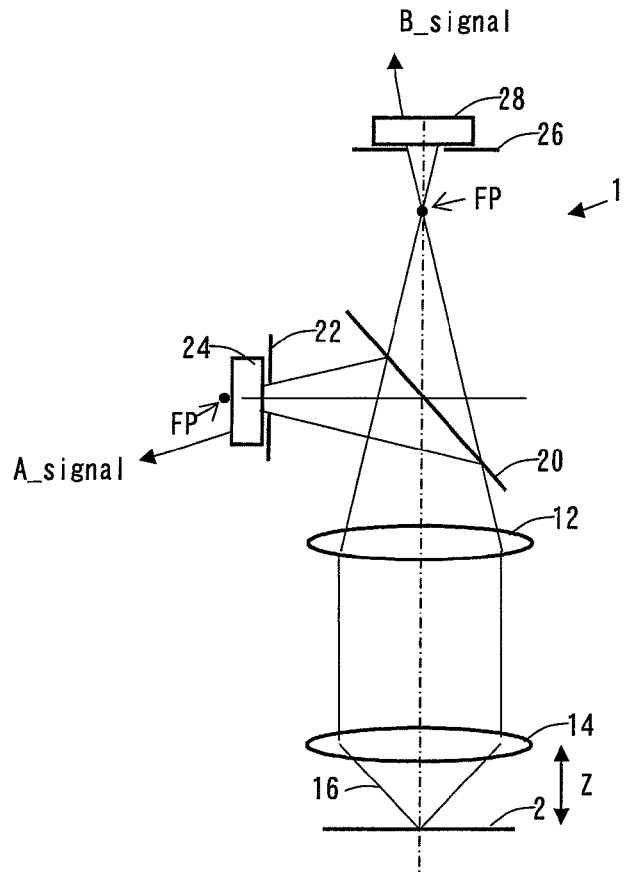
FIG. 7 is a schematic view illustrating an autofocus mechanism according to a conventional technique.
Figure 8:
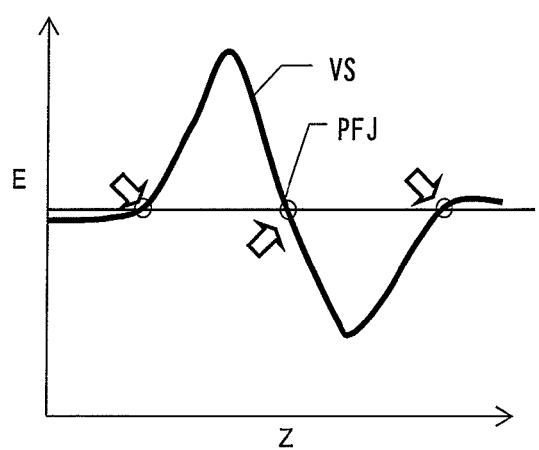
FIG. 8 is a schematic diagram illustrating a change in an S_signal voltage with a distance Z.
Figure 9:
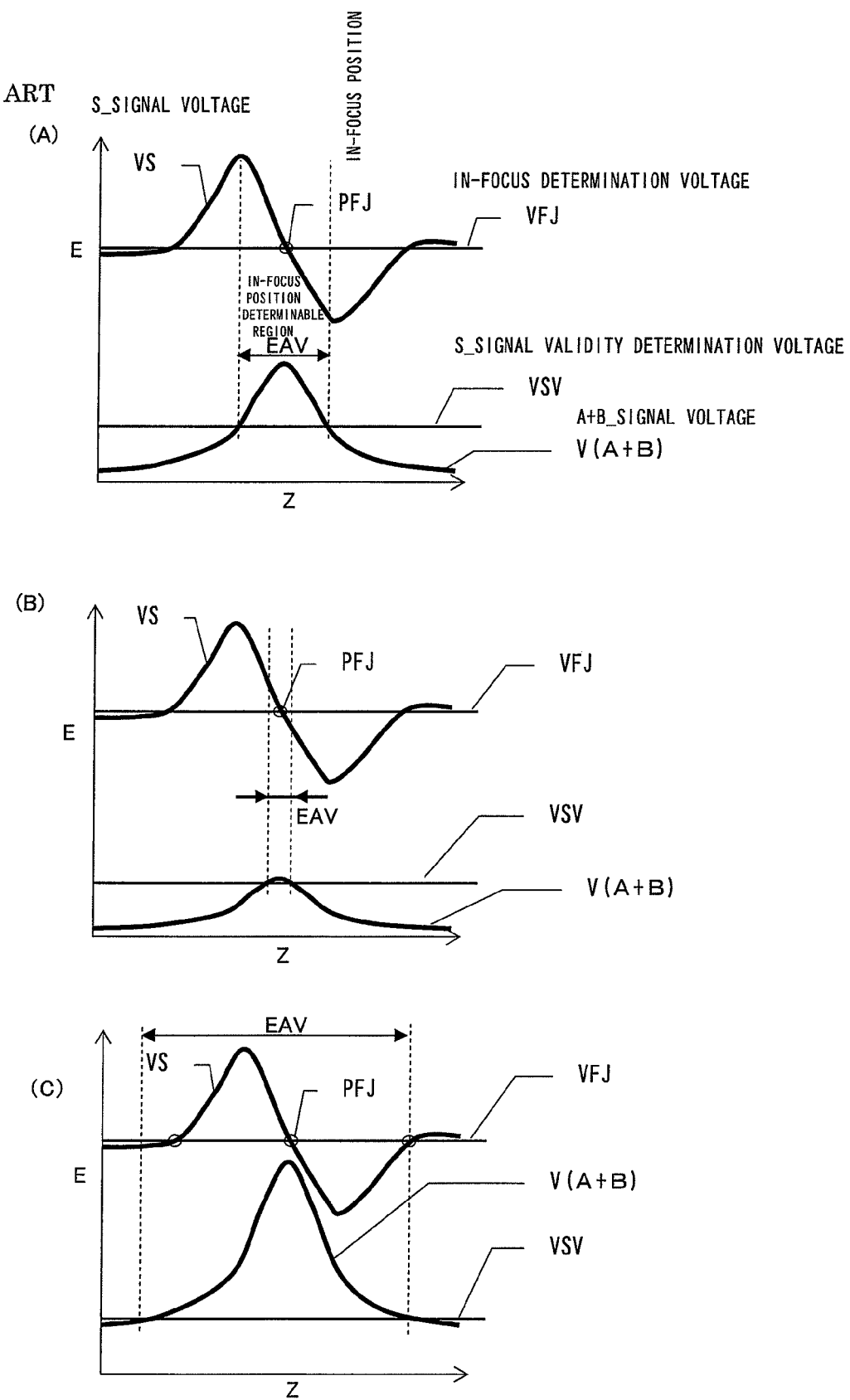
FIG. 9 is a schematic diagram illustrating an in-focus determination voltage and an S_signal validity determination voltage for an A+B_signal voltage and an S_signal voltage under different conditions.

Now, the minimum position U indicative of the minimum voltage of the S_signal voltage VS is calculated (step S30 of FIG. 6). Then, calculated is a second in-focus determination position V on the S_signal voltage VS which is located so as to increase the distance Z between the objective lens 114 and the measurement workpiece 102 from the minimum position U (rightward in the direction of Z in FIG. 5(C)) (step S32 of FIG. 6). The second in-focus determination position V is the position at which the difference between the in-focus determination voltage VFJ and the allowable voltage D (a second in-focus determination voltage VFM2) is equal to the S_signal voltage VS. Then, the A+B_signal voltage V(A+B) at the same distance Z as the second in-focus determination position V is defined as a second lower limit voltage W' (FIG. 5(C), step S34 of FIG. 6).

Then, the higher one of the first and second lower limit voltages R' and W' is defined as the lower limit voltage Vmin of a settable range of the S_signal validity determination voltage VSV. That is, the first lower limit voltage R' and the second lower limit voltage W' are compared (step S36 of FIG. 6). After that, if the first lower limit voltage R' is equal to or greater than the second lower limit voltage W', then the first lower limit voltage R' is employed as the lower limit voltage Vmin (step S38 of FIG. 6, the present embodiment being the case). In contrast, if the first lower limit voltage R' is less than the second lower limit voltage W', then the second lower limit voltage W' is employed as the lower limit voltage Vmin (step S40 of FIG. 6).

Next, a focusing determination position S (=PFJ) is calculated which gives the same voltage as the in-focus determination voltage VFJ which falls between the maximum position P and the minimum position U of the S_signal voltage VS (step S42 of FIG. 6). Then, the A+B_signal voltage V(A+B)

at the same distance Z as the focusing determination position S is defined as the upper limit voltage Vmax (FIG. 5(D) and step S44 of FIG. 6).

Subsequently, the computation & control unit 246 transmits the upper limit voltage Vmax and the lower limit voltage Vmin to the host controller 252 through the external-communication unit 250. The host controller 252 outputs (provides a display notice of) the upper limit voltage Vmax and the lower limit voltage Vmin on the input and output unit 254 as the upper limit value and the lower limit value of a settable range of the S_signal validity determination voltage VSV, i.e., a threshold voltage which determines, as valid, the in-focus determination voltage VFJ at the distance Z at which a voltage obtained by subtracting itself from the A+B_signal voltage V(A+B) is equal to or greater than zero (step S46 of FIG. 6).

In the case of a measurement workpiece having a plurality of portions of different reflectivities, each portion has a different A+B_signal voltage V(A+B) for the distance Z between the objective lens and the measurement workpiece. Thus, according to conventional techniques, each portion had a different optimum S_signal validity determination voltage VSV, thereby causing the S_signal validity determination voltage VSV to be set with difficulty.

In contrast to this, in the present embodiment, the upper limit value and the lower limit value of a settable range of the S_signal validity determination voltage VSV for autofocus control is notified. This means that it is possible to indicate the upper limit voltage Vmax and the lower limit voltage Vmin of a settable range of the S_signal validity determination voltage VSV for each portion of the measurement workpiece 102. Because of this, if a range common to each of the portions of the measurement workpiece 102 is available, then a value may be set as the S_signal validity determination voltage VSV within that common range, thereby enabling autofocus control on all the portions. Even if no range common to each portion of the measurement workpiece 102 is available, it is possible to distinguish an autofocus controllable portion from an autofocus uncontrollable portion on the basis of the setting of the S_signal validity determination voltage VSV that has been set. Thus, for example, design information may be based to identify portions to change the S_signal validity determination voltage VSV for each portion, thereby enabling autofocus control on all the portions of the measurement workpiece 102. That is, the present embodiment is particularly useful for the measurement workpiece 102, like a patterned IC, which has a plurality of portions of different reflectivities. Thus, the autofocus mechanism 100 of the present embodiment is applicable to optical microscopes, FPD (flat panel display) testing/repair apparatus, LCD testing/repair apparatus, IC testing/repair apparatus, and non-contact displacement measuring devices.

Furthermore, in the present embodiment, the S_signal validity determination voltage VSV can be entered into the input and output unit 254, and the processing unit 208 includes the S_signal validity determination voltage storage unit 248 which stores the S_signal validity determination voltage VSV. This makes it possible to provide autofocus control with stability and high reproducibility using the S_signal validity determination voltage VSV defined on the basis of a settable range.

Furthermore, in the present embodiment, the processing unit 208 includes the external-communication unit 250 connected to the computation & control unit 246, and the host controller 252 capable of communicating with the external-communication unit 250, and the host controller 252 is connected with the input and output unit 254. This allows the host controller 252 and the input and output unit 254 to be used in common for a plurality of autofocus mechanisms. That is, the autofocus mechanism 100 can be provided at lower costs.

Thus, the present embodiment can be employed for various types of measurement workpieces 102 while enabling easy-to-handle stable autofocus control.

Note that the aforementioned embodiment is configured such that the S_signal validity determination voltage VSV can be entered into the input and output unit 254, and the processing unit 208 includes the S_signal validity determination voltage storage unit 248 which stores the S_signal validity determination voltage VSV. However, the present invention is not limited thereto. For example, an adjustment mechanism such as an optical head may be included, in the case of which it does not serve as an input and output unit but serves only to display and the adjustment mechanism enables the optical head to be adjusted within a settable range of a defined S_signal validity determination voltage VSV. Or alternatively, the S_signal validity determination voltage storage unit may be eliminated, so that the S_signal validity determination voltage VSV is entered each time autofocus control is provided.

Furthermore, in the aforementioned embodiment, the processing unit 208 includes the external-communication unit 250 connected to the computation & control unit 246, and the host controller 252 capable of communicating with the external-communication unit 250, and the host controller 252 is connected with the input and output unit 254. However, the present invention is not limited thereto. The external-communication unit and the host controller may be eliminated, so that the input and output unit 254 is directly connected to the computation & control unit 246.

Furthermore, in the aforementioned embodiment, the computation & control unit 246 defines the upper limit voltage Vmax and the lower limit voltage Vmin. However, the present invention is not limited thereto. The computation & control unit 246 may control only the exchange of data between the S_signal & A+B_signal & position data storage unit 244, the S_signal validity determination voltage storage unit 248, and the external-communication unit 250, while the host controller 252 performs computations to determine the upper limit voltage Vmax and the lower limit voltage Vmin.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

INDUSTRIAL APPLICABILITY

The present invention relates particularly to an autofocus mechanism which employs a laser beam, and widely applicable to optical microscopes, FPD (flat panel display) testing/repair apparatus, LCD testing/repair apparatus, IC testing/repair apparatus, and non-contact displacement measuring devices.

REFERENCE SIGNS LIST 1, 100 . . . autofocus mechanism
2, 102 . . . measurement workpiece
12 . . . image-forming lens
14, 114 . . . objective lens
16, 116 . . . laser beam
20 . . . beam splitter
22, 122 . . . first pin hole
24, 124 . . . first photodiode 26, 126 . . . second pin hole
28, 128 . . . second photodiode
104 . . . optical head
106 . . . stand
108, 208 . . . processing unit
110 . . . laser diode
112 . . . tube lens
118 . . . first beam splitter
120 . . . second beam splitter
130 . . . position detector unit
132 . . . optical head translation mechanism
134, 234 . . . A_signal voltage converter unit
136, 236 . . . B_signal voltage converter unit
138, 238 . . . A+B_signal voltage converter unit
140, 240 . . . S_signal voltage converter unit
142, 242 . . . S_signal & A+B_signal voltage detector unit
144, 244 . . . S_signal & A+B_signal & position data storage unit
146, 246 . . . computation & control unit
148, 248 . . . S_signal validity determination voltage storage unit
150, 250 . . . external-communication unit
152, 252 . . . host controller
154, 254 . . . input and output unit

The invention claimed is:

1. An autofocus mechanism, comprising:
an objective lens that collects a laser beam to irradiate a measurement workpiece therewith;
a beam splitter that splits light reflected from the measurement workpiece through the objective lens;
a first light amount restricting element disposed in front of a focal position of one split beam of the reflected light;
a first light-receiving element that receives the reflected beam having passed through the first light amount restricting element;
a second light amount restricting element disposed behind a focal position of the other split beam of the reflected light;
a second light-receiving element that receives the reflected beam having passed through the second light amount restricting element; and
a processing unit that converts signals output from the first and second light-receiving elements into an A_signal voltage and a B_signal voltage, respectively, so as to determine an A+B_signal voltage and an S_signal voltage, which are expressed by Equations (1) and (2) below, wherein
the processing unit includes:
first & second voltage computing means that defines, as a first voltage and a second voltage, A+B_signal voltages at distances between the objective lens and the measurement workpiece, the first voltage and the second voltage being indicative of the maximum voltage and the minimum voltage of the S_signal voltage, respectively;
S_signal validity determination voltage computing means that defines a higher one of the first voltage and the second voltage as an S_signal validity determination voltage serving as a threshold voltage which determines, as valid, an in-focus determination voltage, the in-focus determination voltage being equal to the S_signal voltage obtained when the distance is equal to a focal distance of the objective lens; and
focal distance computing means that defines, as the focal distance of the objective lens, a distance at which the S_signal voltage takes on the in-focus determination voltage, the distance being given by the A+B_signal voltage equal to or greater than the S_signal validity determination voltage, $$A + B\_signal\ voltage = A\_signal\ voltage + B\_signal\ voltage, \quad (1)$$

$$S\_signal\ voltage = \frac{(A\_signal\ voltage - B\_signal\ voltage)}{(A\_signal\ voltage + B\_signal\ voltage)}. \quad (2)$$

2. The autofocus mechanism according to claim 1, comprising a storage unit that stores the S_signal validity determination voltage.

3. The autofocus mechanism according to claim 1, wherein the processing unit includes communication means connected to the S_signal validity determination voltage computing means, and a host controller capable of communicating with the communication means.

4. An autofocus mechanism, comprising:
an objective lens that collects a laser beam to irradiate a measurement workpiece therewith;
a beam splitter that splits light reflected from the measurement workpiece through the objective lens;
a first light amount restricting element disposed in front of a focal position of one split beam of the reflected light;
a first light-receiving element that receives the reflected beam having passed through the first light amount restricting element;
a second light amount restricting element disposed behind a focal position of the other split beam of the reflected light;
a second light-receiving element that receives the reflected beam having passed through the second light amount restricting element; and
a processing unit that converts signals output from the first and second light-receiving elements into an A_signal voltage and a B_signal voltage, respectively, so as to determine an A+B_signal voltage and an S_signal voltage, which are expressed by Equations (1) and (2) below, wherein
the processing unit including:
first lower limit voltage computing means that defines a first lower limit voltage so as to reduce a distance between the objective lens and the measurement workpiece from a maximum position indicative of a maximum voltage of the S_signal voltage, the first lower limit voltage being defined as the A+B_signal voltage at a distance at which the sum of an in-focus determination voltage and an allowable voltage is the S_signal voltage, the in-focus determination voltage being the S_signal voltage obtained when the distance is equal to the focal distance of the objective lens, the allowable voltage being set to be less than a voltage obtained by subtracting the in-focus determination voltage from the maximum voltage;
second lower limit voltage computing means that defines a second lower limit voltage so as to increase the distance from a minimum position indicative of a minimum voltage of the S_signal voltage, the second lower limit voltage being defined as the A+B_signal voltage at the distance at which a difference between the in-focus determination voltage and the allowable voltage is equal to the S_signal voltage;
lower limit voltage computing means that defines a higher one of the first and second lower limit voltages as a lower limit voltage;

upper limit voltage computing means that defines, as an upper limit voltage, the A+B_signal voltage at the distance which gives the in-focus determination voltage between the maximum position and the minimum position of the S_signal voltage; and output means that outputs the upper limit voltage and the lower limit voltage as an upper limit value and a lower limit value of a settable range of an S_signal validity determination voltage, the S_signal validity determination voltage being a threshold voltage for determining, as valid, the in-focus determination voltage at the distance at which a voltage obtained by subtracting itself from the A+B_signal voltage is equal to or greater than zero, $$A + B\_signal\ voltage = A\_signal\ voltage + B\_signal\ voltage, \quad (1)$$

$$S\_signal\ voltage = \frac{(A\_signal\ voltage - B\_signal\ voltage)}{(A\_signal\ voltage + B\_signal\ voltage)}. \quad (2)$$

5. The autofocus mechanism according to claim 4, wherein the output means serves as an input and output unit into which the S_signal validity determination voltage can be entered, and the processing unit includes a storage unit that stores the S_signal validity determination voltage.

6. The autofocus mechanism according to claim 4, wherein the processing unit includes communication means connected to the lower limit voltage computing means and the upper limit voltage computing means, and a host controller capable of communicating with the communication means, and the host controller is connected with the output means.

* * * * *